(12) United States Patent
Molina et al.

(10) Patent No.: US 12,130,026 B2
(45) Date of Patent: Oct. 29, 2024

(54) HYDRAULIC SEPARATOR WITH REDUCED HEAT DISPERSION AND CONTROL METHOD THEREFOR

(71) Applicant: Giacomini S.p.A., San Maurizio d'Opaglio (IT)

(72) Inventors: Samuele Molina, San Maurizio d'Opaglio (IT); Marco Rosa Brusin, San Maurizio d'Opaglio (IT); Paolo Arrus, San Maurizio d'Opaglio (IT)

(73) Assignee: GIACOMINI S.P.A., Novara (IT)

( * ) Notice: Subject to any disclaimer, the term of this patent is extended or adjusted under 35 U.S.C. 154(b) by 11 days.

(21) Appl. No.: 17/613,734

(22) PCT Filed: May 22, 2020

(86) PCT No.: PCT/IB2020/054874
§ 371 (c)(1),
(2) Date: Nov. 23, 2021

(87) PCT Pub. No.: WO2020/240370
PCT Pub. Date: Dec. 3, 2020

(65) Prior Publication Data
US 2022/0243929 A1    Aug. 4, 2022

(30) Foreign Application Priority Data

May 27, 2019    (IT) .................. 102019000007359

(51) Int. Cl.
| | |
|---|---|
| F24D 3/10 | (2006.01) |
| F24D 19/10 | (2006.01) |
| G05D 7/06 | (2006.01) |

(52) U.S. Cl.
CPC ......... *F24D 3/1091* (2013.01); *G05D 7/0641* (2013.01); *G05D 7/0664* (2013.01);
(Continued)

(58) Field of Classification Search
CPC .. F24D 19/1015; F24D 3/1091; F24D 3/1066; F24D 2220/0271; F24D 2220/042;
(Continued)

(56) References Cited

U.S. PATENT DOCUMENTS

| | | | | |
|---|---|---|---|---|
| 3,150,827 A | * | 9/1964 | Mohn | ................. F24D 19/1015 122/406.1 |
| 3,729,051 A | * | 4/1973 | Mannion | ................... F24F 11/84 165/246 |

(Continued)

FOREIGN PATENT DOCUMENTS

| | | |
|---|---|---|
| DE | 19642721 A1 | 4/1997 |
| DE | 29911410 A1 | 8/1999 |

(Continued)

OTHER PUBLICATIONS

Translation of EP 3184917, year 2017.*
(Continued)

*Primary Examiner* — William M McCalister
(74) *Attorney, Agent, or Firm* — Mark Malek; Jonathan D. Staudt; Widerman Malek, PL

(57) ABSTRACT

A hydraulic separator for hydronic systems for heating and/or cooling, including a hollow body with a casing, internally defining a chamber; at least two first through openings for the delivery of a fluid, and at least two second through openings for the return of the fluid, said first openings and said second openings being made on said casing of the body and being suitable to put in fluid communication said chamber to external circuits by hydraulic connecting means, further includes at least a mobile element suitable for separating said chamber of the body in a first portion and a second portion, in such a way to reduce the opening section of passage and of fluid contact between said first portion and said second portion. The invention (Continued)

further includes a control method tor the hydraulic separator and hydronic systems for heating and/or cooling.

14 Claims, 9 Drawing Sheets

(52) U.S. Cl.
CPC ........ *F24D 3/1066* (2013.01); *F24D 19/1015* (2013.01); *F24D 2220/0221* (2013.01); *F24D 2220/0271* (2013.01); *F24D 2220/042* (2013.01); *Y10T 137/86107* (2015.04); *Y10T 137/87249* (2015.04)

(58) Field of Classification Search
CPC ..... F24D 2220/0221; Y10T 137/86107; Y10T 137/87249; G05D 7/0641; G05D 7/0664; G05D 11/131; G05D 11/135
USPC .............................................. 137/565.26, 597
See application file for complete search history.

(56) References Cited

U.S. PATENT DOCUMENTS

| | | | | |
|---|---|---|---|---|
| 3,897,903 A | * | 8/1975 | Race ................... | F24D 19/1015 236/36 |
| 4,516,597 A | * | 5/1985 | Ueda ................... | F16K 27/0218 251/306 |
| 4,566,628 A | * | 1/1986 | Latarius .............. | F16K 11/0853 137/630.2 |
| 4,708,287 A | * | 11/1987 | De Wit .............. | G05D 23/1932 237/8 R |
| 5,139,225 A | * | 8/1992 | Olson ................... | F16K 27/003 251/335.2 |
| 6,223,772 B1 | * | 5/2001 | Cummings ............. | F16K 51/02 251/267 |
| 7,954,508 B2 | * | 6/2011 | Doyle ..................... | C02F 1/008 137/554 |
| 9,864,383 B2 | * | 1/2018 | Reider ................. | G05D 7/0676 |
| 2008/0099081 A1 | * | 5/2008 | Yamamoto ................ | F16K 1/44 137/497 |

FOREIGN PATENT DOCUMENTS

| | | | | |
|---|---|---|---|---|
| DE | 10102022 A1 | 7/2001 | | |
| DE | 202006019415 U1 | 4/2007 | | |
| EP | 3184917 A1 | * | 6/2017 | ............... F16K 1/44 |
| FR | 2894013 A1 | 6/2007 | | |

OTHER PUBLICATIONS

International Search Report in related application PCT/IB2020/054874 dated Sep. 22, 2020; 6 pages.
Written Opinion in related application PCT/IB2020/054874 dated Sep. 22, 2020; 8 pages.

* cited by examiner

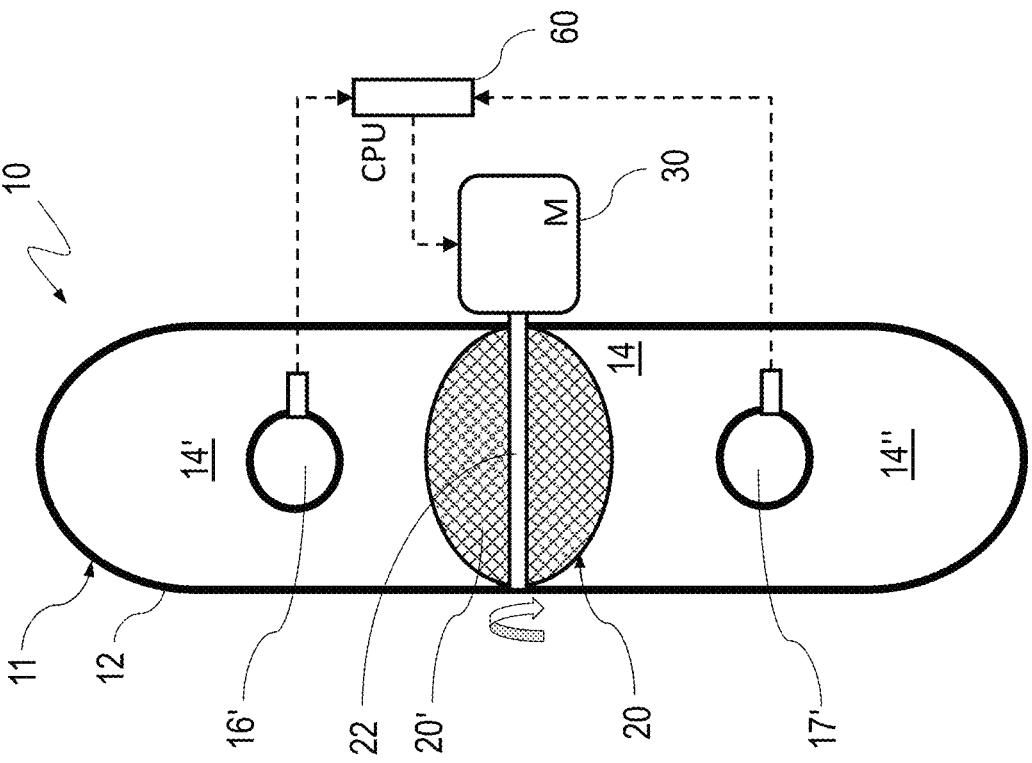
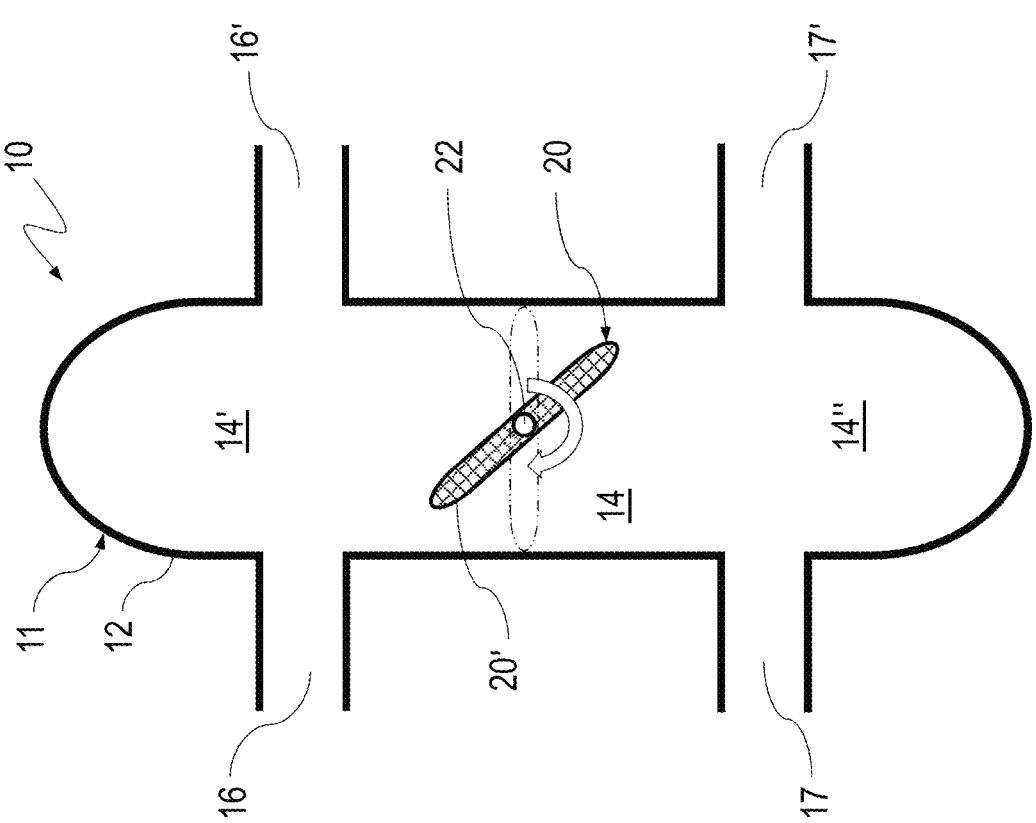

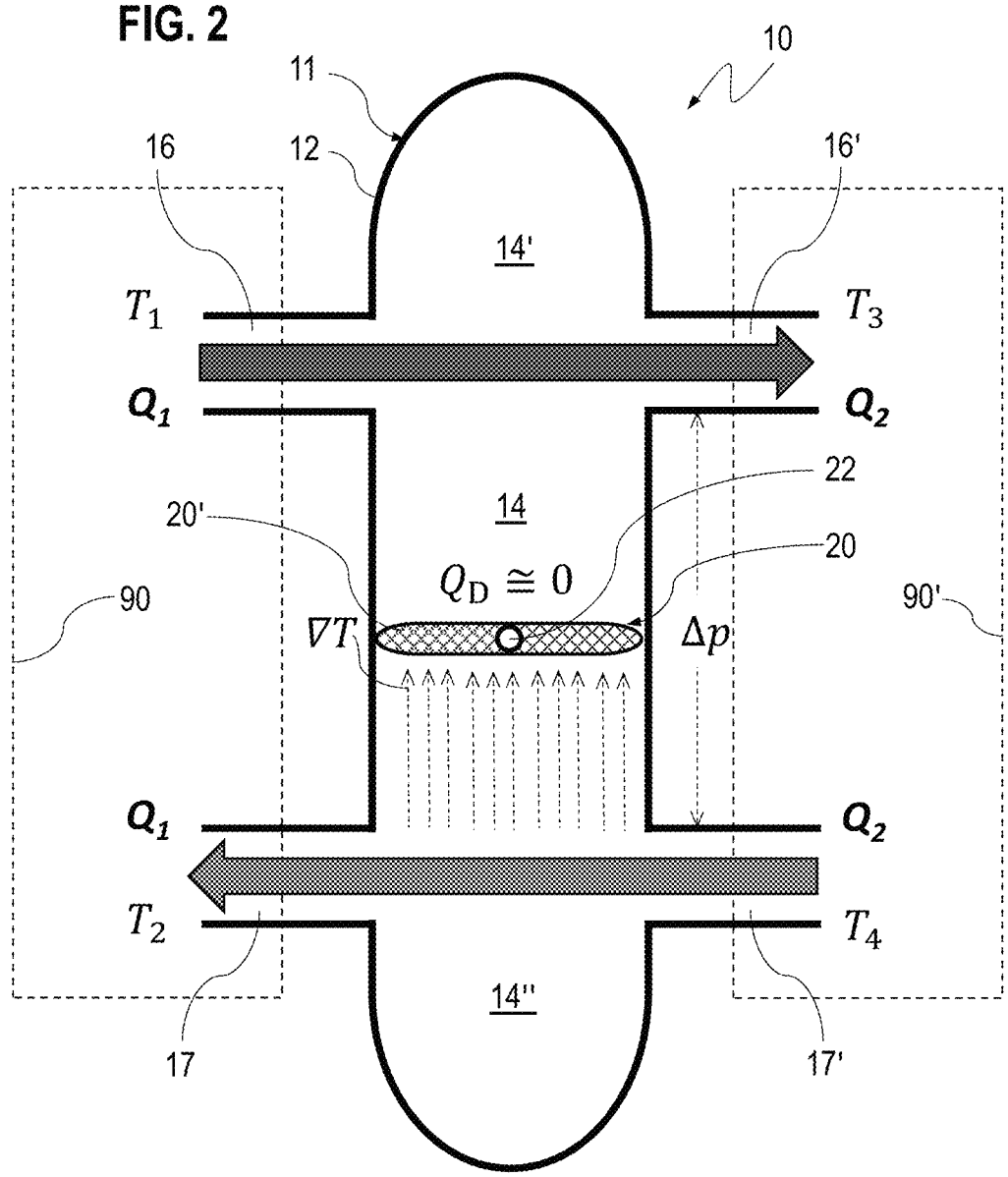

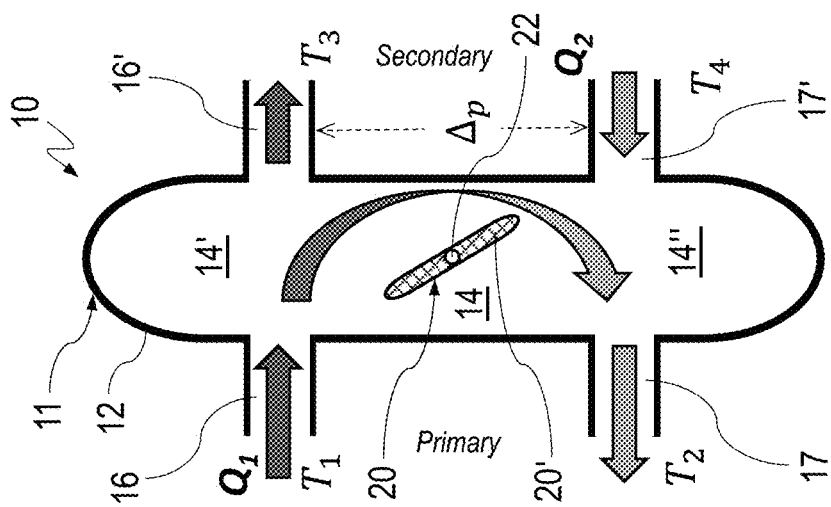
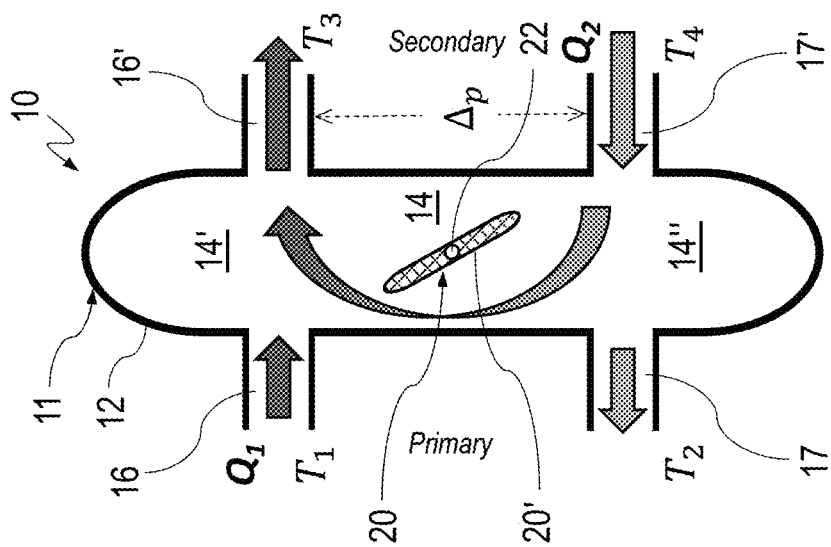

FIG. 4 *PRIOR ART*
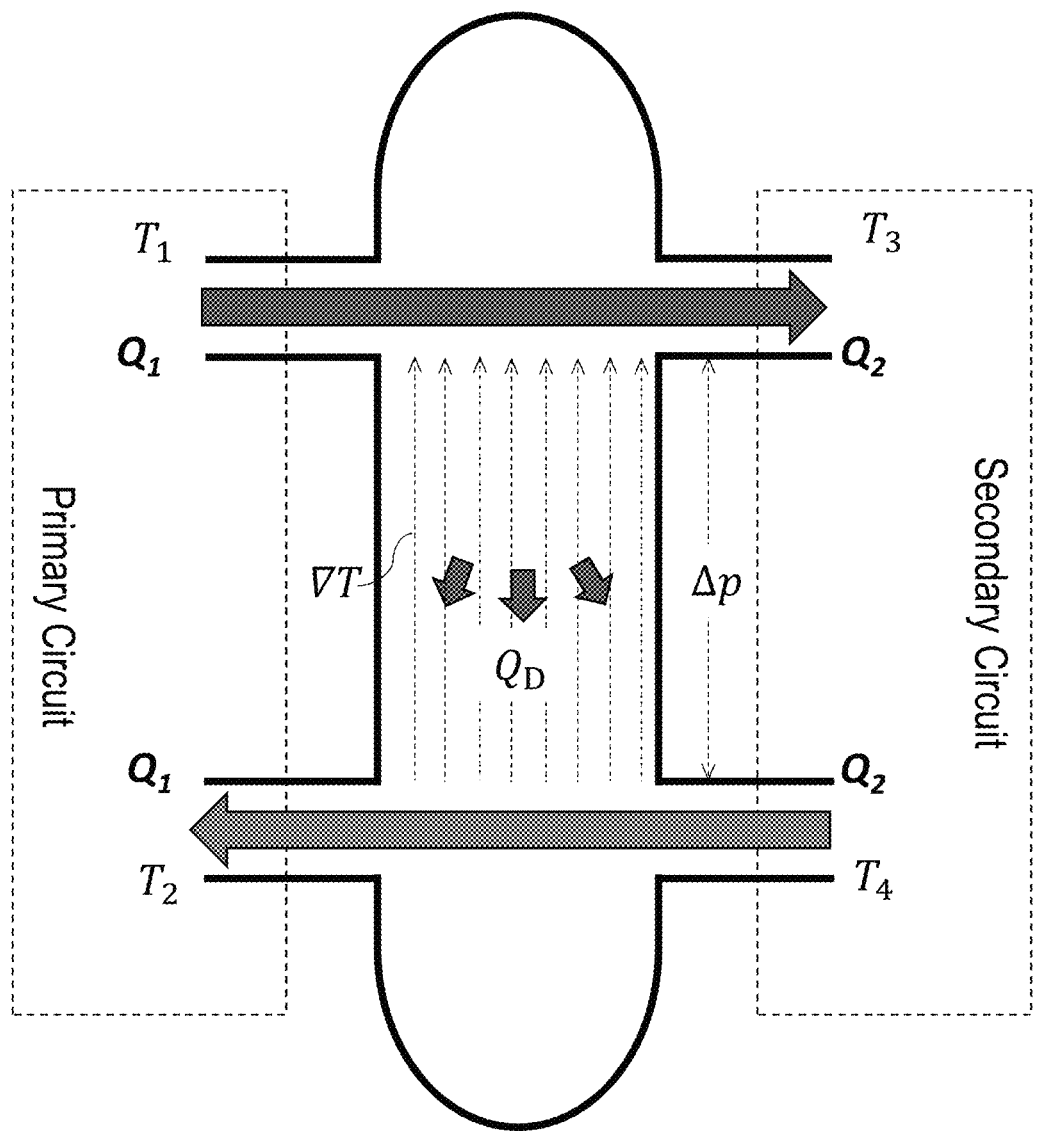
$\Delta_p = 0$
$Q_1 = Q_2$
$T_1 > T_3$
$T_2 < T_4$

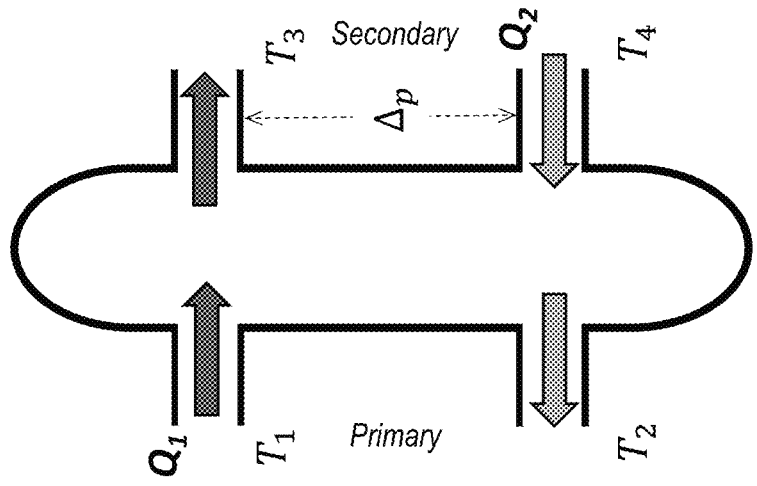
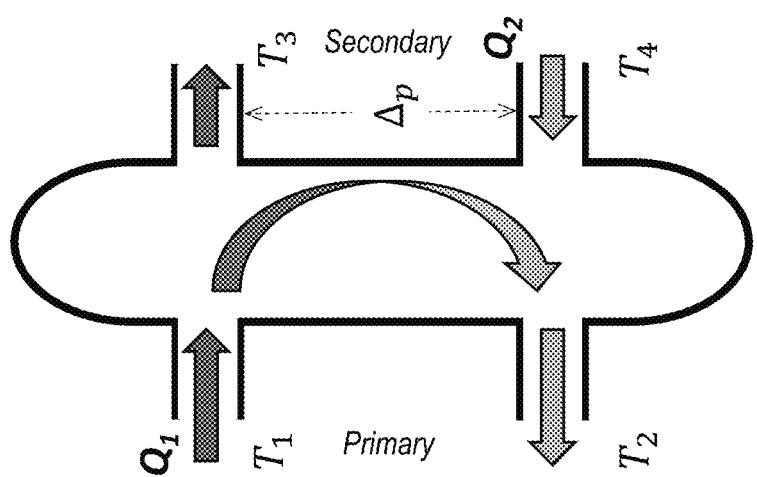
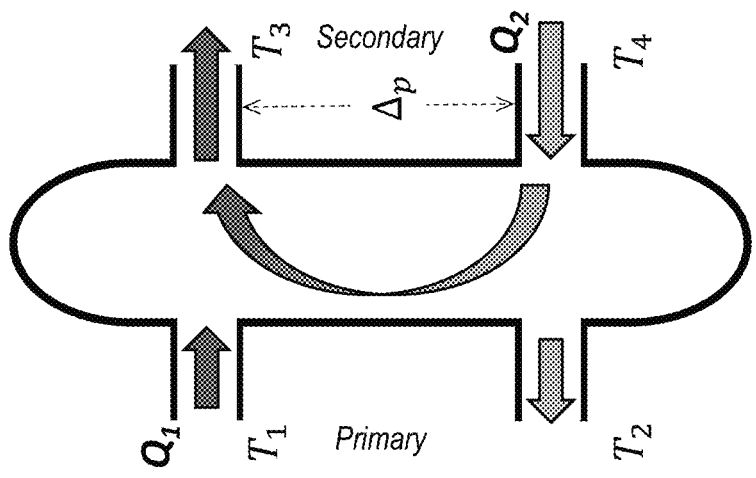

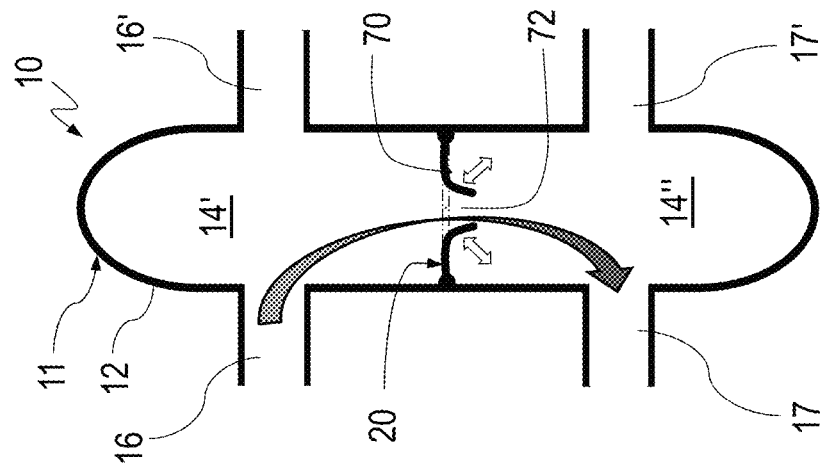
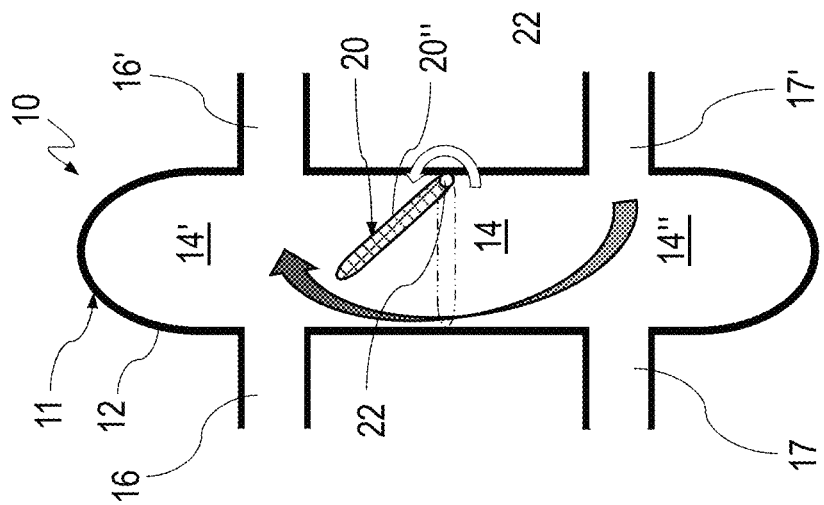
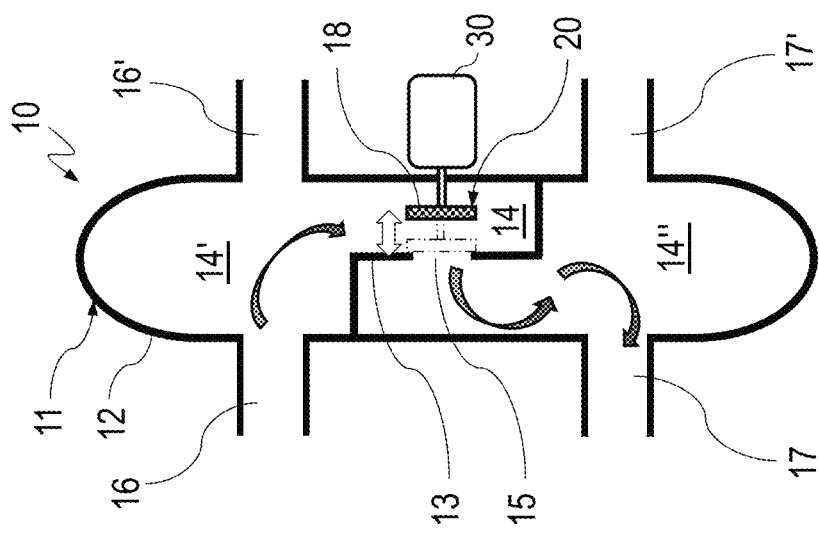

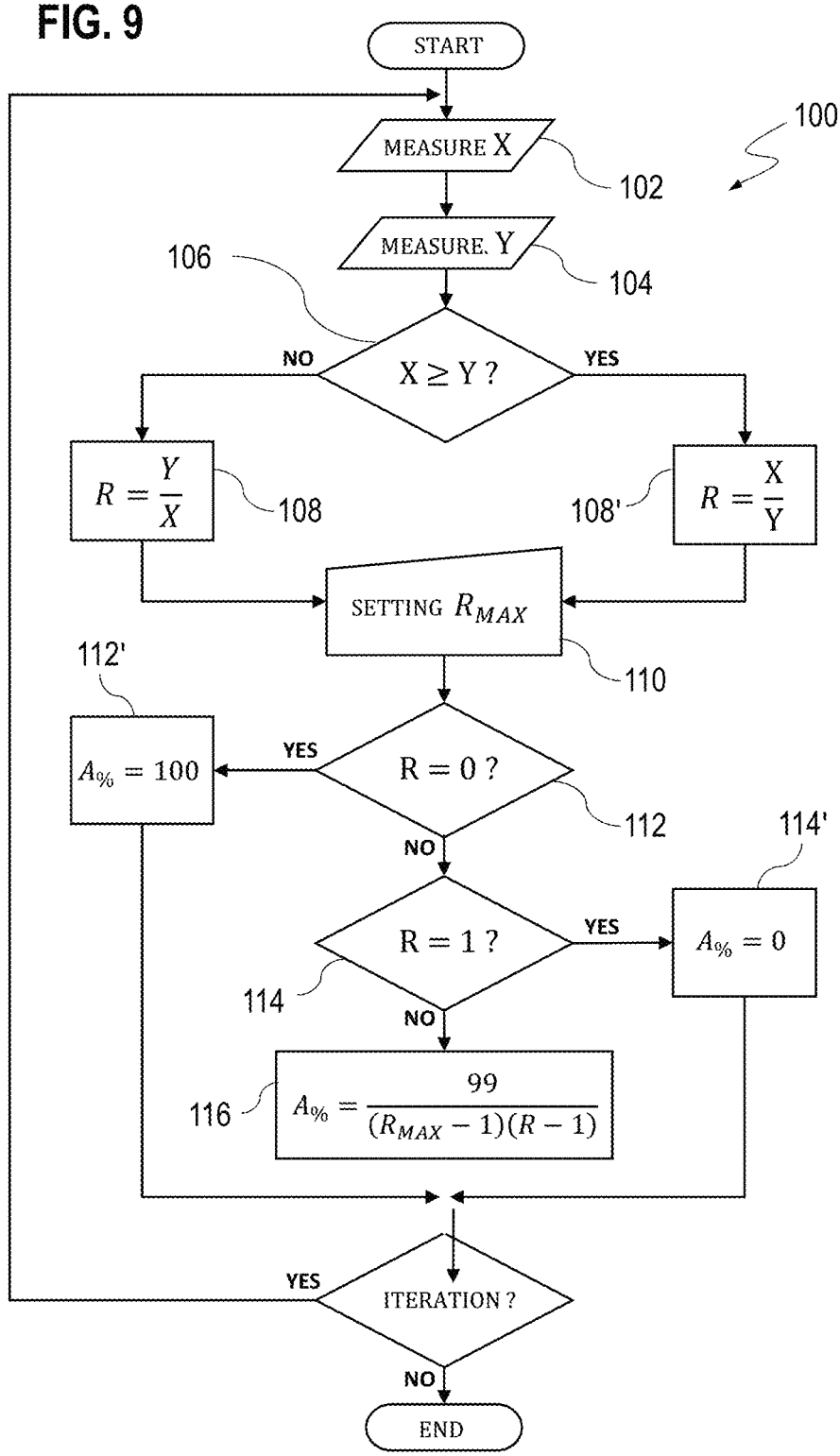

HYDRAULIC SEPARATOR WITH REDUCED HEAT DISPERSION AND CONTROL METHOD THEREFOR

RELATED APPLICATIONS

This application is a national phase application of and claims priority under 35 U.S.C. § 371 of PCT Application No. PCT/IB2020/054874 filed on May 22, 2020 and titled HYDRAULIC SEPARATOR WITH REDUCED HEAT DISPERSION AND CONTROL METHOD THEREFOR, which claims the benefit of IT 102019000007359, filed on May 27, 2019, each of which is hereby incorporated by reference in its entirety.

FIELD OF TECHNOLOGY

The present invention refers to a hydraulic separator with reduced heat dispersion and a control method thereof.

More specifically, the present invention refers to a hydraulic separator device for hydronic and thermic systems with a reduced heat dispersion between the fluid flows in contact with each other at different temperatures, at the inlet and outlet of the separator, and to the relative control method thereof.

BACKGROUND

In up-to-date hydronic and thermal systems for heating and/or cooling, hydraulic devices so-called separators are widely used and they are designed to decouple an hydraulic circuit in a upstream hydraulic circuit and a downstream hydraulic circuit, in order to make them independent as flow rates, dynamic pressures and other plant fluid-mechanic disturbance factors such as fluid circuit dependencies, eddy currents, etc.

The hydraulic separator is typically arranged between the manifold of the "primary" upstream circuit, typically the one of the thermal energy supply, and the manifold of the "secondary" downstream circuit, typically the one of thermal users, where both circuits are generally equipped with one or more flow circulation means such as hydraulic pumps or equivalent.

With preliminary reference to FIG. 4, a traditional hydraulic separator generally consists of a tubular metal casing or casing closed at the ends by two heads, said hydraulic separator internally defining a casing or chamber, advantageously oblong in shape, arranged in fluid connection with at least four through openings made on the outer casing. These openings respectively identify two delivery openings for the heat transfer fluid coming from the primary source circuit and entering the secondary user circuit, and two return openings for the heat transfer fluid returning to the primary source circuit and leaving the secondary user circuit.

The hydraulic separator can be vertically arranged, with the oblong part perpendicular to the ground or horizontally arranged, with the oblong part parallel to the ground.

These delivery and return openings are typically formed on the body of the hydraulic separator in fluid communication with the inner chamber and they are traditionally arranged perpendicular to the longitudinal axis of the hydraulic separator itself. In a normal installation configuration, with reference again to FIG. 4, these delivery openings connect the hydraulic separator chamber with the delivery manifold arriving from the primary circuit and the delivery manifold entering the secondary user circuit, these delivery openings being generally facing each other and coaxially arranged in fluid communication on the internal chamber of the hydraulic separator.

The return openings, on the other hand, connect the hydraulic separator chamber with the return manifold arriving from the secondary circuit and the return manifold entering the primary source circuit, known as delivery openings since they are also generally facing each other and coaxially arranged in fluid communication on the internal chamber of the hydraulic separator.

There are, however, well known examples of hydraulic separators in which the pair openings, delivery and return, are arranged in fluid communication with the hydraulic separator chamber in a non-coaxial way between the respective openings of the single pair.

Hydraulic separators can be equipped with perforated baffles or nets, arranged inside the separator chamber and suitable to intercept the fluid flow passing from one opening to the other in such a way as to block any air or gas bubbles, impurities or slag, which are subsequently eliminated by waste valves usually placed on the heads of the outer casing of said hydraulic separator.

In order to improve the thermal efficiency of the system, and to limit heat dispersion, in up-to-date systems the hydraulic separators can also be provided with an additional casing or insulating material coat to limit heat transmission and dispersion through the outer casing of the hydraulic separator.

A typical example of such known devices is described in the U.S. Pat. No. 7,117,888 B2, which refers to a traditional hydraulic separator suitable for installations between a primary liquid circuit and a secondary liquid circuit, so that said primary and said secondary circuit are hydraulically independent. Said hydraulic separator has an elongated body with an internal space or chamber delimited by a wall. In the internal space there is a supply opening coming from the primary liquid circuit and an exhaust port leading to the primary liquid circuit, said to be located substantially on one longitudinal side of the hydraulic separator. Also in the internal space there are a supply opening leading to the secondary circuit of the liquid and an exhaust port leading back from the secondary circuit of the liquid, said being substantially on a different longitudinal side of the separator. The incoming supply opening from the primary liquid circuit and the exhaust port leading to the secondary liquid circuit are substantially at a first height zone of the hydraulic separator. The exhaust port leading to the primary liquid circuit and the inlet opening from the secondary liquid circuit are substantially at a different height in a second height zone of the hydraulic separator. In the space inside the hydraulic separator, both in the first height zone and in the second height zone, a set of open filling bodies are arranged with a large surface area in relation to the volume they occupy inside the separator.

As previously mentioned, the function of a hydraulic separator is to separate the thermal circuit of a heating and/or cooling system into two hydraulic sub-circuits, a primary circuit and a secondary circuit, in such a way as to allow the incoming fluid from the delivery opening, coming from the heat source of the primary circuit, to be conveyed directly into the return manifold of the primary circuit, through the separator chamber, in case the circulation hydraulic pumps and the flow of the secondary user circuit are stopped while the fluid circulation pumps and the flow of the primary circuit are moving.

Always with initial reference to FIG. 4 and also to figures from 5a to 5c, when the fluid circulation pumps in the secondary and primary circuits do not produce the same flow rate Q an hydraulic unbalance occurs between the heat source circuit and the user circuit, with its various branches, which can be generally measured by increasing the pressure difference Δp, measured between the delivery and return manifolds of the primary and secondary circuits. When, for example, the flow rate $Q_1$ generated by the fluid circulation pump of the primary circuit is greater than the flow rate $Q_2$ required by the user circuit (FIG. 5b), the excess rate part flows from the delivery opening coming from the primary circuit directly to the return opening returning to the primary circuit, passing through the hydraulic separator chamber and creating a bypass or an hydraulic short circuit.

When, on the other hand, the flow rate $Q_2$ required by the fluid circulation pumps of the secondary circuit of the user is greater than the flow rate $Q_1$ generated by the primary or source circuit (FIG. 5a), the rate part of missing fluid flow returns from the return opening at the secondary circuit outlet directly to the delivery opening at the inlet to the same secondary circuit, always passing through the chamber of the hydraulic separator and realizing also in this case a bypass or an hydraulic short circuit.

In the operating and functional conditions illustrated in FIGS. 5b and 5b, referring, for example, to a separator installed on a heat production and distribution system for heating, the thermal efficiency of the system is limited because a considerable part of the heat or frigorific capacity of the heat transfer fluid is not used or is dispersed, being diverted together with the compensation fluid flowing inside the hydraulic separator. These special conditions (FIGS. 5a and 5b) must therefore be a transient state as far as possible and must be avoided in the steady state of operating conditions.

The same considerations can be made, mutatis mutandis, with regard to a separator installed on a cooling system.

In the design and control of hydronic heating and/or cooling systems, even by electronic control of the circulation pumps, the ideal balancing condition between the circulation pumps of the primary and secondary circuits is sought, a condition in which the flow rate of the primary circuit $Q_1$ is substantially equal to the flow rate $Q_2$ of the secondary circuit (FIG. 5c), since this is the condition of maximum thermal efficiency of the hydronic system in which the greatest quantity of heat is transferred or subtracted from the secondary circulation system of the user and where the energy dissipated by the system is minimal.

At present, in modern hydronic heating and/or cooling systems, the continuous research for a lower energy consumption and the increasing relevance for the environment protection are pushing more towards to an increasing of systems thermal efficiency aimed to eliminating or limiting all possible dispersion and waste of heat and energy through ducts, devices and components of the thermal system, thus improving the efficiency of the thermodynamic cycle so as to reduce the consumption of raw materials necessary for the production and distribution of heat and/or frigorific capacity.

The hydraulic separators according to the prior art, even in the ideal condition of FIG. 5c, where the flow rates $Q_1$ and $Q_2$ are substantially equivalent, have however some drawbacks and operating limits.

An important limitation of these traditional hydraulic separators installed on typical hydronic heating and/or cooling systems is due to the fact that, even in the ideal case where the flow rates $Q_1$ and $Q_2$ are equal, the two fluid streams entering and leaving the secondary circuit, and passing through the hydraulic separator, are in fluid contact with each other inside the inner chamber of the separator.

Therefore, a quantity of heat or cooling capacity possessed by the inlet fluid is dissipated by thermal contamination between the two streams through the thermal conduction of the fluid inside the separator chamber.

Another important drawback of the above mentioned hydraulic separators according to the prior art is due to the fact that the heat dispersion through the separator chamber increases together with of the thermal gradient between the cold fluid and the hot fluid, i.e. the "thermal head" of temperature available in the thermodynamic cycle.

A further drawback of traditional hydraulic separators is due to the fact that the thermal contamination between the two fluid streams at different temperatures, at the inlet and outlet port of the hydraulic separator, is even greater in the case of flatwise position installation of the device, position in which the elongated part of the separator body is arranged horizontally; in this case in fact, a less stratification of fluid at different temperatures occurs at the two ends of the hydraulic separator chamber with consequent greater arising of rotary eddy currents and convective flow inside the separator that increase the mixing between fluids at different temperatures, contributing to the increase in heat dispersion.

OBJECTS OF THE INVENTION

The object of this invention is to overcome and solve, at least in part, the above-mentioned drawbacks and operative limits.

More in particular, the object of the present invention is to provide a hydraulic separator with reduced thermal dispersion and a control method, suitable to guarantee an increased level of thermal efficiency with reduced dispersion of energy in the hydronic system.

A further object of the present invention is to provide to the user an hydraulic separator with reduces heat dispersion and a control method with a limited eddy currents circulation of fluid inside the chamber and with a less mixing of fluids at different temperatures.

A further object of the present invention is to provide a reduced heat dispersion hydraulic separator capable to assure a high level of strength and reliability over time, such as to be further easily and economically manufactured.

These and other objects are achieved by the hydraulic separator with reduced heat dispersion and the control method subject of the present invention according with the independent claims.

The structural and operative features of the hydraulic separator with reduced heat dispersion and the control method can be better understood from the detailed description below, in which reference is made to the attached drawings that represent some preferred and non-restrictive embodiments.

BRIEF DESCRIPTION OF THE FIGURES

FIG. 1a is a schematic representation of a frontal view in a longitudinal cross section of a preferred embodiment of the hydraulic separator with reduced heat dispersion object of the present invention;

FIG. 1b is a schematic representation of a side view in a longitudinal cross section of the same preferred embodiment of the hydraulic separator with reduced heat dispersion object of the present invention;

FIG. 2 is a schematic representation of a frontal view in a longitudinal cross section of the preferred embodiment of the hydraulic separator with reduced heat dispersion object of the present invention in the operative configuration with equal fluid flow rates in the primary and secondary circuit and closed mobile element with no or limited heat conduction;

FIG. 3a is a schematic representation of a frontal view in a longitudinal cross section of the preferred embodiment of the hydraulic separator with limited heat dispersion object of the present invention in the operative configuration with lower fluid flow rate in the primary circuit and higher flow rate in the secondary circuit;

FIG. 3b is a schematic representation of a front view in a longitudinal cross section of the preferred embodiment of the hydraulic separator with reduced heat dispersion object of the present invention in the operative configuration with higher fluid flow rate in the primary circuit and lower flow rate in the secondary circuit;

FIG. 3c is a schematic representation of a frontal view in longitudinal cross section of the preferred embodiment of the hydraulic separator with reduced heat dispersion object of the present invention in the operative configuration with equal fluid flow rates in the primary and secondary circuit;

FIG. 4 is a schematic representation in a longitudinal cross section view of a traditional hydraulic separator according to the prior art, in the operative configuration with equal fluid flow rates in the primary and secondary circuit with presence of thermal conduction contamination and subsequently heat dispersion between the fluid streams in contact;

FIG. 5a is a schematic representation of a front view in a longitudinal cross section of a hydraulic separator according to the prior art in an operative configuration with lower fluid flow rate in the primary circuit and higher flow rate in the secondary circuit;

FIG. 5b is a schematic representation of a frontal longitudinal cross section view of a hydraulic separator according to the prior art in an operative configuration with higher fluid flow rate in the primary circuit and lower fluid flow rate in the secondary circuit;

FIG. 5c is a schematic representation of a frontal longitudinal cross section view of a hydraulic separator according to prior art in an operative configuration with equal fluid flow rates in the primary and secondary circuits;

FIG. 6a is a schematic representation of a frontal view in a longitudinal cross section of the hydraulic separator object of the present invention with a globe shutter type of mobile element operated by a linear actuator;

FIG. 6b is a schematic representation of a frontal view in a longitudinal cross section of the hydraulic separator of the present invention with a hinged head shutter type of mobile element;

FIG. 6c is a schematic representation of a frontal view in a longitudinal cross section of the hydraulic separator of the present invention with a deformable membrane or diaphragm shutter type of mobile element;

FIG. 9 is a schematic representation of a computer implemented algorithm of the control method to command the opening of the mobile element as a function of the physical parameters of the fluid.

DETAILED DESCRIPTION OF THE INVENTION

Figure 7A:
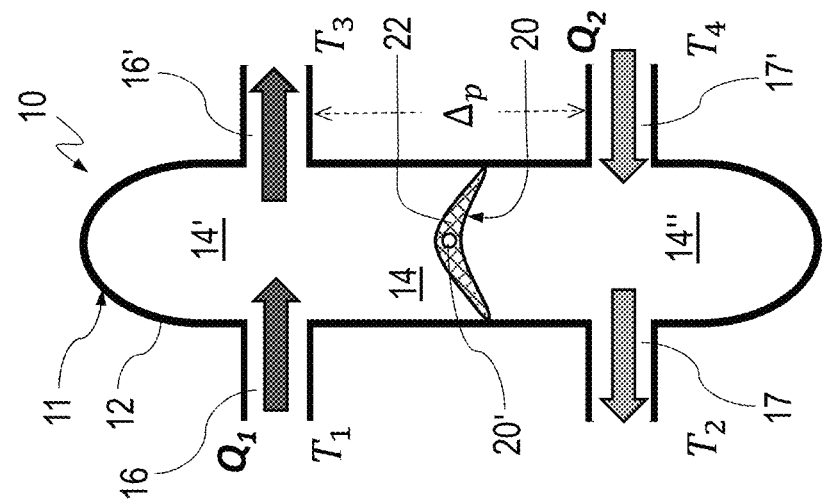
FIGS. 7a, 7b and 7c, are schematic representations of a frontal views in longitudinal cross section of the hydraulic separator object of the present invention in a further embodiment with a hydrodynamic shaped type of mobile element in different operative configurations.

With initial reference to figures from 1a to 2, it is represented, in a preferred embodiment, a hydraulic separator with reduced heat dispersion, in figures specified with 10, for installation on hydronic systems for heating and/or cooling, said hydraulic separator 10 including:

a hollow body 11 with a casing 12 internally defining a chamber 14;

at least two first through openings 16, 16', for the delivery of a fluid and at least two second through openings 17, 17', for the return of a fluid, said first openings 16, 16' and said second openings 17', 17 being obtained on said casing 12 of the body 11 and being suitable to put in fluid communication said chamber 14 to external circuits by hydraulic connection means.

The hydraulic separator 10 of the present invention has the innovative feature of comprising at least one mobile element 20 suitable for separating the chamber 14 of the body 11 in a first portion 14" of volume and a second portion 14" of volume, in such a way as to reduce up to closing the opening section of passage and of fluid contact between said first portion 14' and said second portion 14".

With reference stills to FIGS. 1a to 3c, said mobile element 20 can be advantageously realized as a throttle body comprising a butterfly valve 20' rotatably arranged inside chamber 14 by means of a rotation pin 22.

In the embodiment forms of the figures, said butterfly valve 20' is configured to rotate integrally with the rotation pin 22 rotatably housed by traditional rotation supports or bushes (not shown) disposed on the body 11 of the hydraulic separator 10.

In other alternative embodiments, said mobile element 20 may also comprise two or more mobile or rotating parts rotatably hinged in cooperation with respect to body 11 by means of respective rotation pins, said parts being suitable to prevent or allow the passage of fluid between said first portion 14' and said second portion 14" and vice versa.

The mobile element 20 can generally comprise any traditional shutter or gate valve type or control system, said mobile element 20 being configured to open as result of a fluid pressure difference between said first 14" portion and the second 14" portion of chamber 14 or as consequence of mechanical actuation by a rotational or linear actuator 30, so as to allow the passage of fluid between said first 14" portion and said second 14" portion and vice versa.

Said mobile element 20, comprising also one or more cooperating movable parts, can also be held in a steady closed position of limited or interrupted fluid connection or in an open position, between said first 14" portion and said second 14" portion of chamber 14, by means of traditional returning elastic elements (not shown), such as compression springs or torsion springs.

With reference particularly to the embodiment of the figures from 1a to 3c, said mobile element 20 comprising the butterfly valve 20 can be advantageously connected by means of the rotation pin 22 to a rotational actuator 30, electromechanical, electric or fluidic servomechanism, said rotational actuator 30 being configured to rotate the rotation pin 22 with the butterfly valve 20' so as to limit or interrupt the fluid flow between the first 14' portion and the second 14" portion of chamber 14 and vice versa.

Another innovative feature of the mobile element 20, comprising for example a 20" butterfly valve, is to can be made of insulating material with low thermal conductivity, such as polymeric plastics or thermo-polymers or other equivalent materials, in such a way as to further reduce the thermal gradient VT between said first portion 14' and said second portion 14" and limit or prevent the dispersion of heat $Q_D$ through the cross section of chamber 14 of hydraulic separator 10.

With particular reference to FIGS. 6a, 6b and 6c, further possible embodiments of the mobile element 20 are showed.

In the embodiment of FIG. 6a, the mobile element 20 comprise a globe type 18 shutter operated by an electric or electromechanical actuator 30, which opens or closes by a linear translatory movement a passage opening 15 obtained in a baffle 13 which separates the first portion 14' and the second portion 14" of chamber 14 of the hydraulic separator 10. The baffle 13 can generally be made of the same material as the body 11 of the separator but can also be advantageously made of a thermally insulating material.

In the embodiment shown in FIG. 6b, the mobile element 20 includes a rotary shutter 20" hinged or clapet type having a discoidal shape conjugated with chamber 14, said rotary shutter 20" being hinged by means of the rotation pin 22 in correspondence of the diametrical edge with the internal wall of the same chamber 14.

The mobile element 20 can also be advantageously held in a steady position, typically closed, by means of an elastic element (not shown) such as a spiral spring arranged coaxially to the rotation pin 22.

In a further embodiment showed in FIG. 6c, said mobile element 20 can also advantageously comprise a deformable membrane 70 made of elastomeric and thermally insulating material, said membrane 70 being provided with an opening or slit 72, normally closed and able to deform in such a way as to allow the passage of fluid between the first portion 14' and the second portion 14" of chamber 14 through said opening or slit 72 and vice versa, when subjected to a pressure difference between the two portions 14', 14" of said chamber 14 of hydraulic separator 10.

With particular reference, again to FIG. 1b, the hydraulic separator 10 can be also advantageously provided of electrical or electronic sensors 40, transducers or detectors, disposed at said first opening 16, 16', or second opening 17, 17' or between them. Said sensors 40 can be pressure sensors suitable to measure the pressure difference Δp between the delivery and return manifolds of a primary circuit 90 and/or a secondary circuit 90' but they can also be flow rate sensors suitable to measure the quantity of fluid in transit in the primary circuit 90 or in the secondary circuit 90', between the first and second openings 16, 16', 17, 17'.

Said sensors 40 can also be temperature sensors, for example thermocouples, placed on each of the first and second openings 16, 16', 17, 17', said temperature sensors being suitable to detect the temperature of the fluid in transit through each opening. Unlike pressure and flow rate sensors, temperature sensors represent a more convenient and advantageous solution as they are constructively simpler, cheaper and easier to manage and interface.

With particular reference again to FIG. 1b, said sensors 40 are generally connected and interfaced with a control unit 60 or electronic board, externally provided or housed on body 11 of hydraulic separator 10.

The measurement carried out by said sensors 40 can correspond to a signal which managed and processed by control unit 60 is such to control the opening of the mobile element 20 in a proportional manner or in response to a function of the pressure difference Δp, so as to allow to increase or decrease of the fluid passage and fluid communication between the first portion 14' of chamber 14 and the first openings 16, 16' with the second portion 14' of chamber 14 and the second openings 17, 17'.

Said mobile element 20, in a further alternative form not shown, may also include a hole, a shaping or a through opening, formed on the same movable element 20 and such that the same, in a closed position, does not totally prevent fluid communication between said first portion 14' and said second portion 14", allowing to discharge any overpressure of fluid on one or the other portion 14', 14" of chamber 14.

Figure 7B:
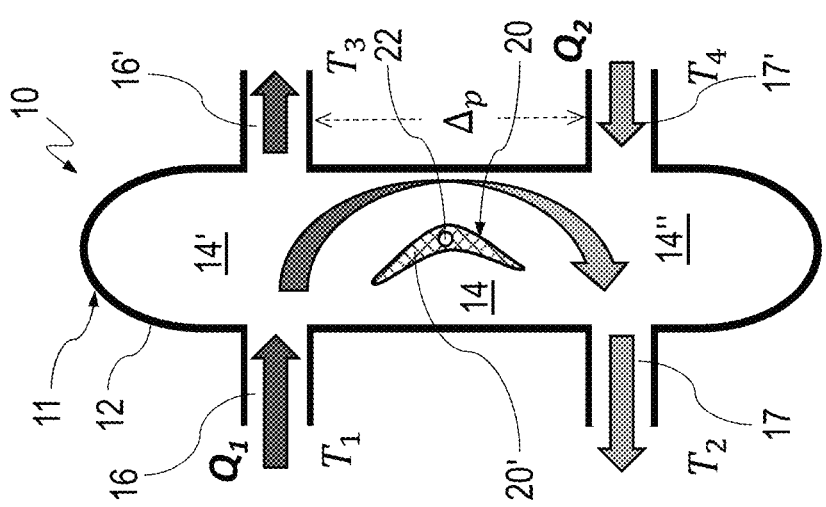
Figure 7C:
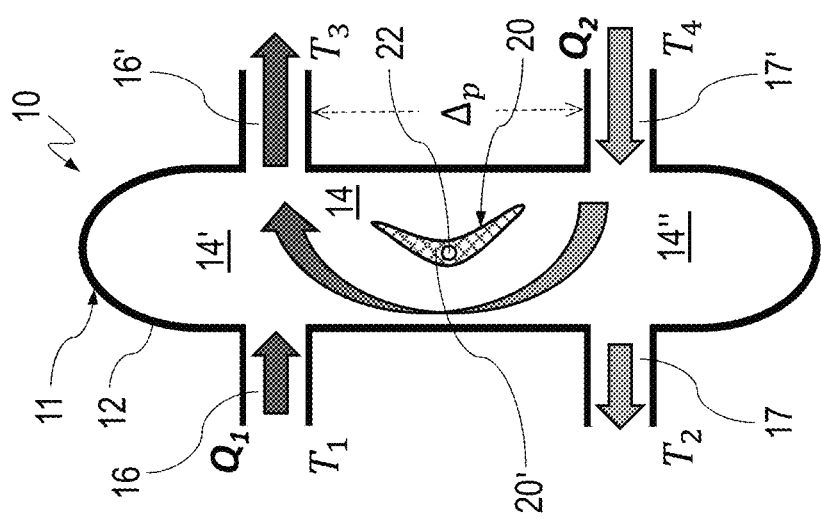

In other possible embodiments, as in the example of FIGS. 7a, 7b and 7c, said at least one mobile element 20 can have a hydrodynamic or aerodynamic shape of the butterfly valve 20', i.e. a profile with a curved or airfoil section such as hydraulic turbine blades, said shape being suitable for facilitate, in open position, the circulation of the compensation fluid flowing between the first and second opening 16, 17 or between the second and first opening 17', 16', by orienting the butterfly valve 20' and arranging the hydrodynamic profile of the butterfly valve section according to the substantially "U" direction of the compensation fluid flow and efficiently convey the same between the manifolds in order to limit the obstruction to the passage of the fluid due to the mobile element 20 and avoid fluid dynamic turbulence and eddy currents inside chamber 14.

From the description of the hydraulic separator 10 with reduced heat dispersion object of this invention, the operation described below is deducted.

In the description of the following operation, as in the attached drawings, the practical case of operation of hydraulic separator 10 installed in a system for the production and distribution of heat for heating is taken into consideration.

Therefore, it will be evident to the skilled person, how the same considerations can be made, mutatis mutandis, to the practical case in which hydraulic separator 10 is installed on a system for the generation and circulation of a cold fluid for cooling.

With general reference always to FIGS. 1a to 2 and in particular to FIGS. 3a to 3c, the hydraulic separator 10 with reduced heat dispersion object of the present invention provides an advantageous technical solution compared to traditional hydraulic separators because it allows to prevent, or at least significantly reduce, the dispersion of heat through the cross-section of the internal chamber 14 of the same hydraulic separator 10.

In the operating condition of hydraulic separator 10, shown as example in FIG. 3a, the flow rate required by the secondary circuit 90' is greater than that of the primary circuit 90; the pressure sensors 40 detect a pressure difference Δp between the delivery and return manifolds of the circuits connected to hydraulic separator 10 and send a signal to control unit 60 which commands actuator 30 to open the mobile element 20, so that part of the liquid flow can flow directly from the second opening 17' returning from the secondary circuit 90' of user to the first opening 16' returning in the user circuit so as to compensate for the insufficient flow rate coming from the primary circuit 90 of source.

In the operating condition of hydraulic separator 10, shown as example in FIG. 3b, the flow rate required by the secondary circuit 90' is lower than that available by the primary circuit 90; the pressure sensors 40 detect also in this case a pressure difference Δp between the delivery and return manifolds of the two circuits connected with hydraulic separator 10 and send a signal to control unit 60 that controls also in this case the opening of the mobile element 20 by means of actuator 30, so that part of the liquid flow can flow directly from the first opening 16 of arrival from the primary circuit 90 source, to the second opening 17 of return in the primary circuit source, in order to compensate the insufficient flow rate from the secondary circuit 90' of the user.

It should be noted that the mobile element 20 can open even without being actuated by an actuator but only as a result of the fluid difference pressure such as to overcome the resistance of the elastic element (not shown) which tends to keep the same mobile element in the closed position.

In the ideal operating case shown in FIG. 3c, with reference also to FIG. 2, the fluid flow rates in the primary circuit 90 and in the secondary circuit 90' are equivalent. The pressure sensors 40 detect a pressure differential Δp close to zero and the mobile element 20 remains in closed position preventing or significantly limiting the fluid exchange between the first portion 14' and the second portion 14" of chamber 14, and vice versa.

With particular reference to FIG. 2, in the balanced operation of the system, chamber 14 of hydraulic separator 10 is not crossed by any compensation fluid flow rate and the liquid in the same chamber 14 is substantially stationary, while the fluid stream of "hot" liquid moving at temperature $T_1=T_3$ flows directly from the first opening 16 to the second opening 16' and the fluid stream of "cold" liquid moving back at temperature $T_2=T_4$, lower than $T_1=T_3$, flows directly from the second opening 17' to the first opening 17. The stationary liquid inside chamber 14, in direct fluid contact with the fluid stream moving at different temperatures between the first and second openings 16, 16', 17, 17', cannot however conduct heat through the mobile element 20, which separates the stationary liquid inside the first portion 14' and the second portion 14" of chamber 14, said stationary liquid being at different temperatures in the first portion 14' and in the second portion 14".

The mobile element 20, advantageously made of thermally insulating material, interrupts therefore the field of the thermal gradient VT (FIG. 2) between the two fluid streams at different temperatures preventing contamination by thermal conduction through the stationary liquid present in chamber 14, as is the case in a traditional hydraulic separator, shown in FIG. 4.

The mobile element 20 can also be advantageously configured to open by a measure or an angle proportional for example to the pressure difference Δp in such a way as to allow the passage, when necessary, of a greater or lesser amount of compensation fluid.

Optional holes, openings or shaping on the mobile element 20, for example on the butterfly valve 20' of the figures, prevent the total separation of fluid between the first portion 14' and the second portion 14" of chamber 14 keeping in any case limited or negligible the heat exchange and thermal contamination between the fluid streams at different temperatures, providing however a discharge opening in case of pressure peaks in the system or in case of failure of actuator 30 with a consequent non-opening.

The particular hydrodynamic conformation of the mobile element 20, such as that of the butterfly valve 20' in FIGS. 7a, 7b and 7c, also allows a better circulation of the compensation liquid flow rate through chamber 14, better conveying the compensation fluid flow between the manifolds and avoiding turbulence or eddy currents inside the same chamber 14.

It is also part of the present invention a control method 100 for a hydraulic separator 10 and hydronic systems for heating and/or cooling comprising the steps of:

providing a hydraulic separator 10 comprising a hollow body 11 with a casing 12 internally defining a chamber 14;

supplying a delivery of fluid through at least two first openings 16, 16' of body 11 and returning through at least two second openings 17, 17' of body 11, said first openings 16, 16' and said second openings 17, 17' being configured to put in fluid communication a chamber 14 of body 11 to one or more external circuits by means of hydraulic connection;

separating of said internal chamber 14 in a first portion 14' and a second portion 14", by means of at least one thermally insulating mobile element 20;

controlling by means of said mobile element 20 of the passage opening and section of thermal contact according to a function of the fluid flow passing between said first portion 14' and said second portion 14" in such a way as to limit the thermal heat conduction between the same first and second portion 14', 14" of chamber 14.

The control method 100, in the case of control of the mobile element 20 by means of an actuator 30 controlled by a control unit 60, before the controlling step it can comprise further step of:

measuring 102 of physical variables of the fluid flowing through the first openings 16, 16' and the second openings 17, 17' of the body 11 relative to the fluid in primary circuit 90 by means of sensors 40;

sending the data of the variables detected by sensors 40 and processing by means of a control unit 60;

controlling of the moving element 20 by means of an actuator 30 according to a function of the state of the physical variables in such a way as to vary the fluid passage section of the fluid inside chamber 14.

The measuring step of the physical variables of the fluid can comprise measuring steps of fluid flow rate $Q_1$ in the primary circuit 90 and the fluid flow rate $Q_2$ in the secondary circuit 90', measured by sensors 40 or flowmeters (mass or volumetric) between the inlet and outlet openings at separator 10 of the respective primary and secondary circuits 90, 90'.

In a further alternative form, the measuring step of the physical variables of the fluid may also comprise measurements of the temperature differential $\Delta T_1$ of the fluid in the primary circuit 90 and the temperature differential $\Delta T_2$ of the fluid in the secondary circuit 90', measured by temperature sensors 40 between the inlet and outlet openings of the hydraulic separator 10 of the respective primary and secondary circuits 90, 90'.

In another further alternative form, the measuring step of the physical variables of the fluid can comprise measurements of the pressure differential $\Delta p_1$ of the fluid in the primary circuit 90 and the pressure differential $\Delta p_2$ of the secondary circuit 90', measured by pressure sensors 40 between the inlet and outlet openings of the hydraulic separator 10 of the respective primary and secondary circuits 90, 90'.

From the description of the steps of method 100 and from the following example of computer implemented algorithm the operation described below is deducted.

With particular reference also to the flow chart of FIG. 9, the measuring and controlling steps of method 100 can be implemented in a computer comprising the steps below:

measuring 102 of a physical quantity X relative to the fluid in the primary circuit 90;

measuring 104 of a physical quantity Y relative to the fluid in the secondary circuit 90';

comparing 106 of X and Y values and setting 108 of the value R=X/Y if X≥Y or setting 108' of the value R=Y/X if Y>X;

setting 110 of the $R_{max}$ parameter relative to a maximum limit ratio R;

comparing 112 of the R value and setting 112' of the opening command of the moving element 20 to a value $A_\%$=100 (total opening) if R=0;

comparing 114 of the value of R and setting 114' of the command to open the movable element to a value $A_\%$=0 (closing) if R=1;

setting 116 of the mobile element 20 opening command to a value of $A_\%$=99/($R_{max}$−1)(R−1), when 0≠R≠1.

From the known energy equivalence between fluid flow rate Q and thermodynamic temperature T of the fluid, expressed by the equation $Q_1/Q_2=\Delta T_2/\Delta T_1$, measuring steps 102 and 104 can also be respectively a measuring steps of the temperature differential $\Delta T_1$ of the fluid in the primary circuit 90 and a measurement of temperature differential $\Delta T_2$ of the fluid in the secondary circuit 90' measured by temperature sensors 40 between the inlet and outlet openings of the separator 10 of the respective primary and secondary circuits 90, 90'.

Figure 8:
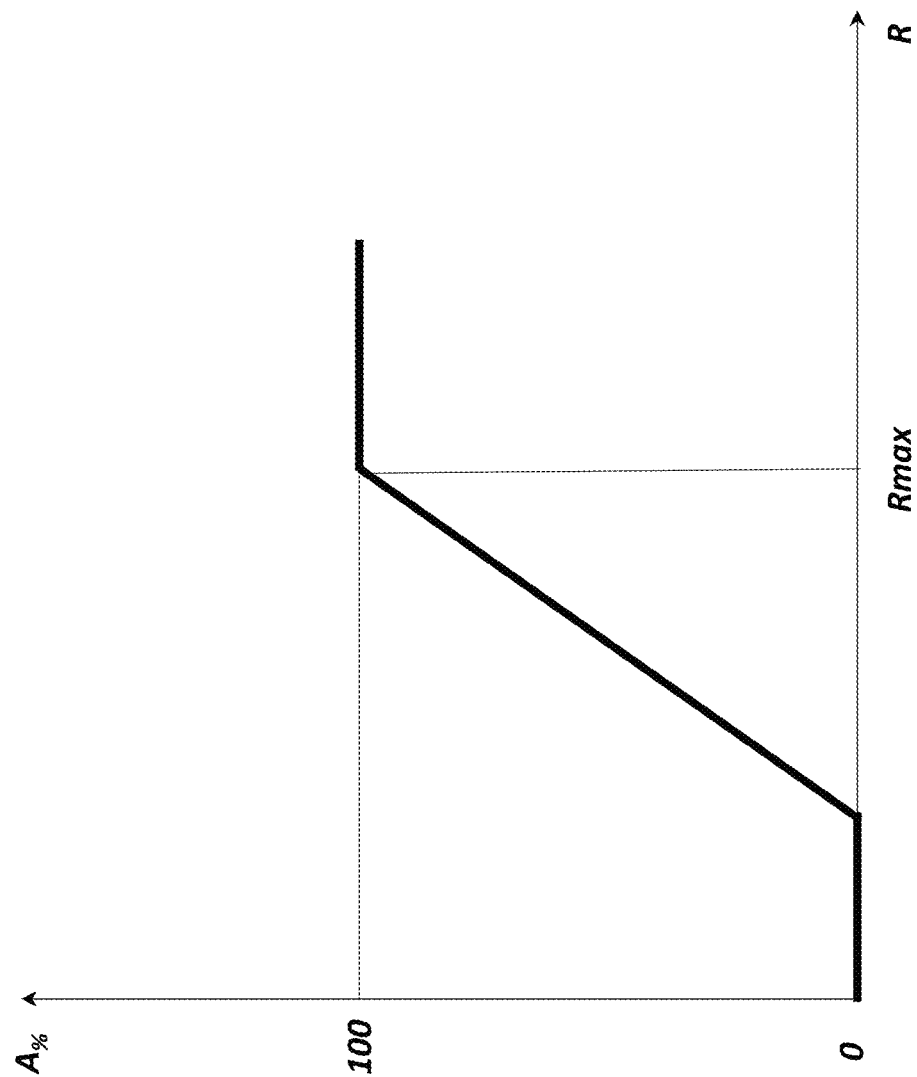
FIG. 8 is a schematic representation of the graph of the function of the opening control of the mobile element in ordinates and the relationship between the physical variables of the fluid in abscissae.

The percentage of opening $A_\%$ of the moving element 20 can be proportional to an angle of rotation of the same moving element 20. At a fluid passage light in the internal chamber 14 etc. is generally proportional to a ramp math function, as in the graph of FIG. 8, where the opening $A_\%$ increases proportionally to the R value up to the $R_{max}$ value. It will be obvious to the expert of the branch how the opening $A_\%$ of element 20 can be any mathematical relation function of R.

As can be seen from the above, the advantages that the hydraulic separator 10 with reduced heat dispersion and the control method 100 of the present invention achieve are evident.

The hydraulic separator 10 with limited heat dispersion object of the present invention is particularly advantageous because it allows the hydraulic separation of a hydronic system for heating and/or cooling, allowing at the same time a lower energy consumption and an improved efficiency and overall thermal efficiency of the system.

The hydraulic separator 10 with reduced thermal dispersion object of this invention is also particularly advantageous because it allows to make the hydraulic separator 10 independent from the vertical or horizontal mounting position of the elongated part, since the mobile element 20 is not sensitive to the stratification of fluid at different temperatures at the two ends of chamber 14 and eliminates the onset of eddy currents that increase the mixing between fluid at different temperatures increase the thermal dispersion.

The hydraulic separator 10 with reduced thermal dispersion of the present invention is also particularly advantageous because it makes possible to provide to the user with a device which can be easily integrated into modern and efficient hydronic and thermos mechanical systems without limiting the available thermal difference and the consequent quantity of heat exchanged between the source and the thermal user.

Although the invention has been described above with particular reference to some preferred embodiments, given as an example and not limited, many modifications and variations will appear evident to a skilled person in the light of the above description. The present invention, therefore, is intended to cover all modifications and variants, which fall within the scope of the following claims.

The invention claimed is:

1. A hydraulic separator for hydronic systems for heating and/or cooling, comprising:

a hollow body with a casing, internally defining a chamber;

at least two first through openings for the delivery of a fluid, and at least two second through openings for the return of the fluid, said first through openings and said second through openings being made on said casing of the body and operable to establish fluidic communication between the chamber and to external circuits by hydraulic connection;

at least one mobile element separating the chamber of the body into a first portion and a second portion, to reduce fluidic communication between said first portion and said second portion of the chamber;

a control unit;

at least one actuator connected to the at least one mobile element and positioned in communication with and operably controlled by the control unit; and a plurality of electric or electronic sensors or transducers connected to the control unit configured to measure a physical parameter of the fluid, at least one sensor of the plurality of sensors being positioned at or between at least one of the first through openings and at least one of the second through openings;

wherein said sensors send a pressure difference signal to the control unit corresponding to the physical parameter of the fluid measured by said sensors;

wherein said at least one mobile element comprises a butterfly valve made of a thermal insulating material to limit thermal heat conduction between the first portion of the chamber and the second portion of the chamber;

wherein the at least one mobile element is actuated by the actuator; and wherein the control unit controls the actuator responsive to the pressure difference signal.

2. The hydraulic separator according to claim 1 further comprising at least one rotation pin positioned within the chamber, wherein said butterfly valve is rotatably arranged inside the chamber and operable to rotate about one of the at least one rotation pin.

3. The hydraulic separator according to claim 2, wherein the butterfly valve is configured to rotate integrally with the rotation pin rotatably housed by at least one of traditional rotation supports and bushes disposed on the body.

4. The hydraulic separator according to claim 1, further comprising at least one rotation pin positioned within the chamber, wherein said at least one mobile element comprises at least two mobile parts, wherein the at least two mobile parts are rotatably hinged with respect to the body and rotatable about one of the at least one rotation pin.

5. The hydraulic separator according to claim 1, wherein the at least one mobile element is held in a steady position by a returning elastic element.

6. The hydraulic separator according to claim 1, wherein the actuator comprises at least one of a linear actuator and a rotational actuator.

7. The hydraulic separator according to claim 1, wherein the at least one mobile element is made of plastic thermopolymer material.

8. The hydraulic separator according to claim 1, wherein the sensors are pressure sensors.

9. The hydraulic separator according to claim 1, wherein the sensors are temperature sensors.

10. The hydraulic separator according to claim 1, wherein the sensors are at least one of mass and volumetric flowmeters.

11. A control method for hydronic plants for heating and/or cooling, comprising the steps of:
providing a hydraulic separator comprising a control unit, a plurality of electric or electronic sensors or transducers connected to the control unit, and a hollow body with a casing, the interior of the casing defining a chamber;
supplying a delivery of fluid through at least two first openings of the body and returning the fluid through at least two second openings of the body, the first openings and said second openings being configured to put the chamber of the body in fluid communication with one or more external circuits by hydraulic connections;
separating the chamber into a first portion and a second portion by at least one thermally insulating butterfly valve to limit thermal heat conduction between the first portion and the second portion of the chamber; and
measuring a physical parameter of the fluid with said sensors, at least one sensor of said sensors being positioned at or between at least one of the first through openings and at least one of the second through openings;
sending a pressure difference signal with and from said sensors to the control unit corresponding to the physical parameter of the fluid measured by said sensors;
controlling at least one actuator connected to the at least one thermally insulating butterfly valve with the control unit responsive to the pressure difference signal to control the passage opening and section of thermal contact with the at least one thermally insulating butterfly valve according to a function of the flow of a fluid between the first portion and the second portion in such a way as to limit the thermal heat conduction between the first and second portions of the chamber.

12. The method according to claim 11, wherein the controlling step further comprises the steps of:
measuring physical variables of the fluid flowing through the first openings and second openings of the body relative to the fluid in a primary circuit via said sensors;
sending the data of the variables detected by said sensors to the control unit and processing the data using the control unit; and
controlling the at least one thermally insulating butterfly valve by operation of the at least one actuator according to a function of the state of the physical variables in such a way as to vary the fluid passage section of the fluid inside chamber.

13. The method according to claim 12, wherein the measuring steps are a step of measuring the pressure differential of the fluid in the primary circuit and a step of measuring the pressure difference in the secondary circuit, measured by the pressure sensors between the inlet and outlet openings of the hydraulic separator of the respective primary and secondary circuits.

14. The method according to claim 12, wherein the measuring steps are a step of measuring the temperature differential of the fluid in the primary circuit, and a step of measuring the temperature differential of the fluid in the secondary circuit measured by the temperature sensors between the inlet and outlet openings of the hydraulic separator of the respective primary and secondary circuits.

* * * * *